United States Patent
Lee et al.

(10) Patent No.: US 12,082,277 B2
(45) Date of Patent: Sep. 3, 2024

(54) ALLOCATION OF LOWER AND UPPER IDENTIFIERS FOR SIDELINK TRANSMISSION

(71) Applicant: LG Electronics Inc., Seoul (KR)

(72) Inventors: Youngdae Lee, Seoul (KR); Hanbyul Seo, Seoul (KR); Giwon Park, Seoul (KR); Seungmin Lee, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 17/576,543

(22) Filed: Jan. 14, 2022

(65) Prior Publication Data

US 2022/0141897 A1     May 5, 2022

Related U.S. Application Data

(63) Continuation of application No. PCT/KR2020/010777, filed on Aug. 13, 2020.
(Continued)

(51) Int. Cl.
*H04W 76/14*     (2018.01)
*H04W 24/08*     (2009.01)
(Continued)

(52) U.S. Cl.
CPC ........... *H04W 76/14* (2018.02); *H04W 24/08* (2013.01); *H04W 72/1263* (2013.01); *H04W 72/20* (2023.01); *H04W 92/18* (2013.01)

(58) Field of Classification Search
CPC ..... H04W 76/14; H04W 76/11; H04W 24/08; H04W 72/1263; H04W 72/1278; H04W 92/18; H04W 72/20
See application file for complete search history.

(56) References Cited

U.S. PATENT DOCUMENTS

2018/0139724 A1    5/2018   Loehr et al.
2019/0053251 A1*   2/2019   Loehr .................. H04W 72/10
(Continued)

FOREIGN PATENT DOCUMENTS

CN     107211017     9/2017
EP      3937577     1/2022
(Continued)

OTHER PUBLICATIONS $3^{rd}$ Generation Partnership Project; Technical Specification Group Services and System Aspects; "Architecture enhancements for 5G System (5GS) to support Vehicle-to-Everything (V2X) services (Release 16)," 3GPP TS 23.287 V1.1.0, date Jul. 2019, 50 pages.
(Continued)

*Primary Examiner* — Un C Cho
*Assistant Examiner* — Lalita W Pace
(74) *Attorney, Agent, or Firm* — Fish & Richardson P.C.

(57) ABSTRACT

A method and apparatus for allocation of lower identifier (ID) and upper identifier (ID) for sidelink transmission in a wireless communication system is provided. A first wireless device (e.g., receiving user equipment (UE)) receives, via upper layer signaling from a second wireless device (e.g., transmitting UE), a lower ID associated with an upper ID and monitors sidelink control information (SCI) based on the lower ID and the upper ID. The first wireless device receives, from the second wireless device, a data unit scheduled by the SCI.

12 Claims, 12 Drawing Sheets

Related U.S. Application Data

(60) Provisional application No. 62/887,477, filed on Aug. 15, 2019.

(51) Int. Cl.
*H04W 72/1263* (2023.01)
*H04W 72/20* (2023.01)
*H04W 92/18* (2009.01)

(56) References Cited

U.S. PATENT DOCUMENTS

| | | | |
|---|---|---|---|
| 2019/0116586 A1* | 4/2019 | Basu Mallick | H04W 64/00 |
| 2019/0320475 A1* | 10/2019 | Li | H04W 8/005 |
| 2020/0084592 A1* | 3/2020 | Gulati | H04W 4/12 |
| 2020/0313825 A1* | 10/2020 | Ryu | H04L 5/0051 |
| 2020/0344636 A1* | 10/2020 | Lee | H04W 28/0268 |
| 2022/0022168 A1* | 1/2022 | Wang | H04W 72/0406 |

FOREIGN PATENT DOCUMENTS

| | | |
|---|---|---|
| EP | 3942896 | 1/2022 |
| KR | 1020170118703 | 10/2017 |
| WO | WO2020218857 | 10/2020 |
| WO | WO2020222593 | 11/2020 |

OTHER PUBLICATIONS

Catt, "MAC PDU Format in PC5," 3GPP TSG-RAN2 Meeting #106, Reno, USA, dated May 13-17, 2019, 6 pages.

Ericsson, "On Layer 1 IDs," R1-1907152, Revision of R1-1905501, 3GPP TSG-RAN WG1 Meeting #97, Reno, Nevada, USA, dated May 13-17, 2019, 6 pages.

Huawei, HiSilicon, "Sidelink physical layer procedures for NR V2X," R1-1906008, 3GPP RAN WG1 Meeting #97, Reno, USA, dated May 13-17, 2019, 25 pages.

Oppo, "Physical layer procedure for NR-V2X sidelink," R1-1906475, 3GPP TSG RAN WG1 #97, Reno, USA, dated May 13-17, 2019, 14 pages.

Extended European Search Report in European Application No. 20852138.5, dated Jul. 15, 2022, 8 pages.

Huawei, HiSilicon, "Sidelink physical layer procedures for NR V2X," 3GPP TSG RAN WG1 Meeting #96bis, R1-1903944, Xi'an, China, Apr. 8-12, 2019, 17 pages.

Office Action in Chinese Appln. No. 202080052864.1, mailed on Jun. 3, 2023, 14 pages (with English translation).

* cited by examiner

ALLOCATION OF LOWER AND UPPER IDENTIFIERS FOR SIDELINK TRANSMISSION

CROSS-REFERENCE TO RELATED APPLICATIONS

Pursuant to 35 U.S.C. § 119(e), this application is a continuation of International Application PCT/KR2020/010777, with an international filing date of Aug. 13, 2020, which claims the benefit of U.S. Provisional Patent Application No. 62/887,477, filed on Aug. 15, 2019, the contents of which are hereby incorporated by reference herein in their entirety.

TECHNICAL FIELD

The present disclosure relates to allocation of lower and upper identifiers (IDs) for sidelink transmission.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for allocating/providing a lower identifier (ID) associated with an upper ID, e.g., source/destination Layer-2 ID, for sidelink transmission.

An aspect of the present disclosure is to provide a method and apparatus for monitoring/receiving sidelink control information (SCI) and/or sidelink data based on the lower ID.

In an aspect, a method performed by a first wireless device configured to operate in a wireless communication system is provided. The method includes receiving, via upper layer signaling from a second wireless device, a lower ID associated with an upper ID, monitoring sidelink control information (SCI) based on the lower ID and the upper ID, and receiving, from the second wireless device, a data unit scheduled by the SCI.

In another aspect, a method performed by a second wireless device configured to operate in a wireless communication system is provided. The method includes creating a lower ID associated with an upper ID, transmitting, to a first wireless device, the lower ID, and transmitting, to the first wireless device, a data unit scheduled by sidelink control information (SCI) indicating both the upper ID and the lower ID.

In another aspect, an apparatus and/or a software code for implementing the above method is provided.

The present disclosure can have various advantageous effects.

For example, one UE can allocate a lower ID associated with an upper ID to the other UE for a direct link, in particular when the UE performs sidelink transmissions with one or several UEs.

For example, the system can avoid collision of IDs with low overhead in sidelink control information transmissions for the direct link between UEs performing sidelink communication.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

configured to operate in a wireless communication system to which implementations of the present disclosure is applied.

Figure 11:
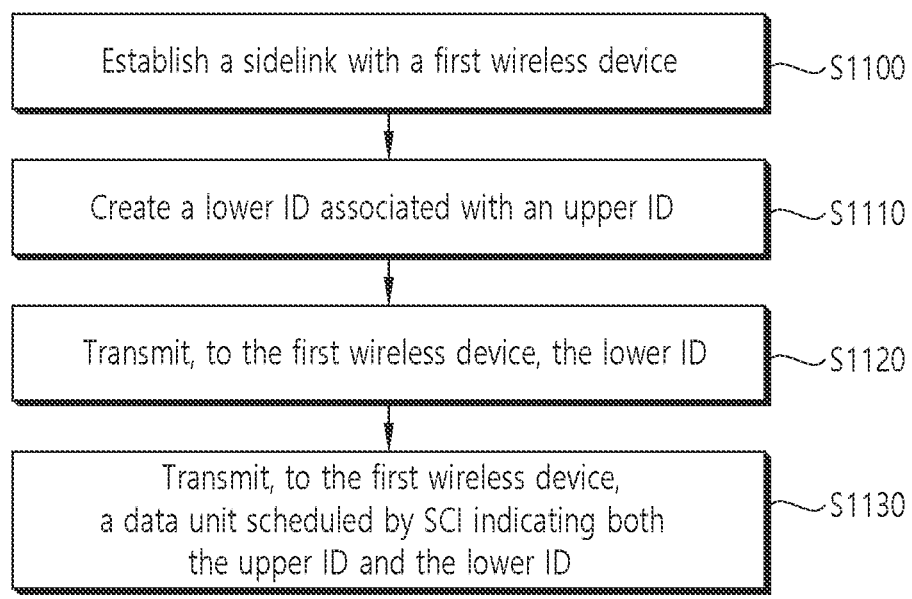

FIG. 11 shows an example of a method performed by a second wireless device (e.g., transmitting (TX) wireless device) configured to operate in a wireless communication system to which implementations of the present disclosure is applied.

Figure 12:
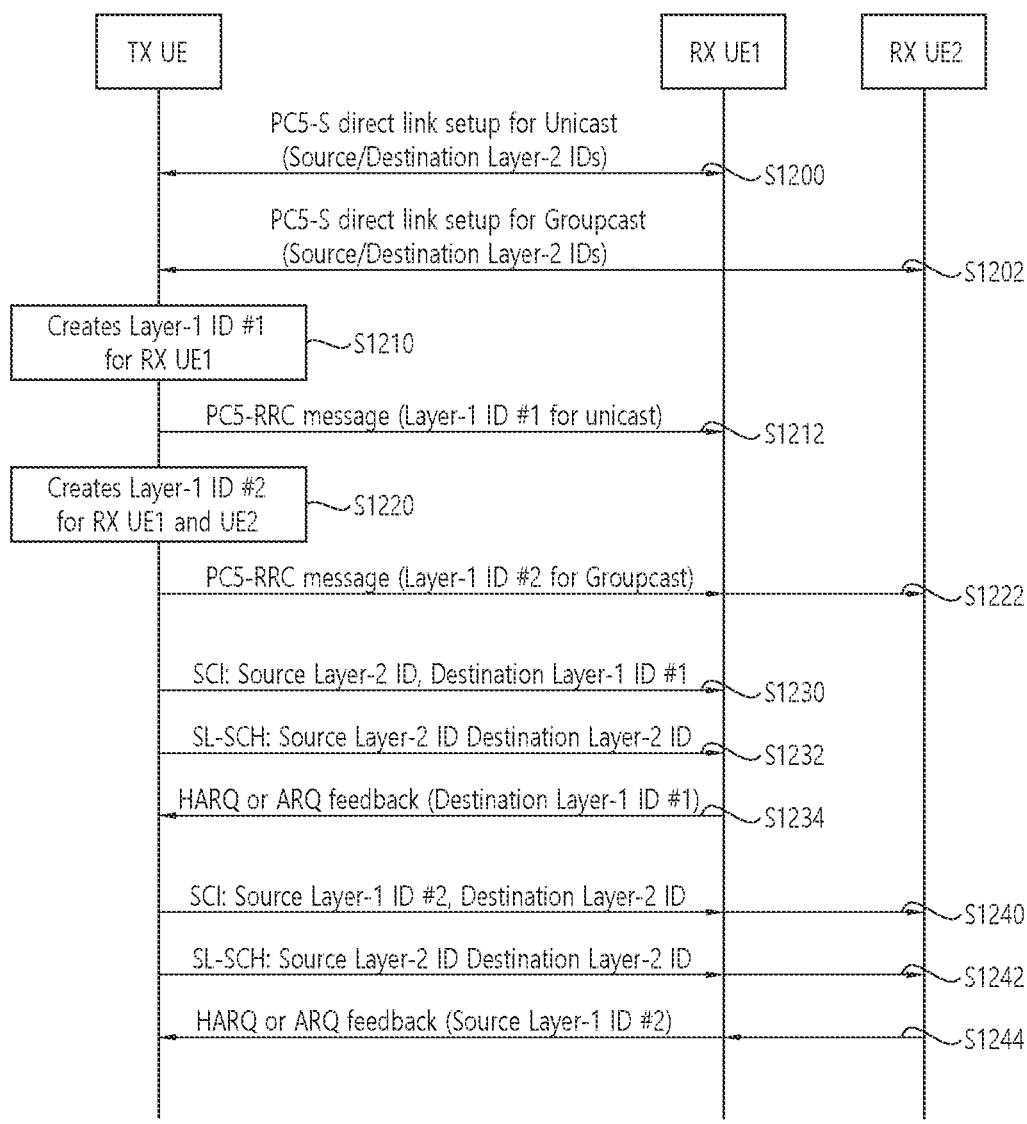

FIG. 12 shows an example of PC5 procedures for a UE performing sidelink communication to which implementations of the present disclosure is applied.

DETAILED DESCRIPTION

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
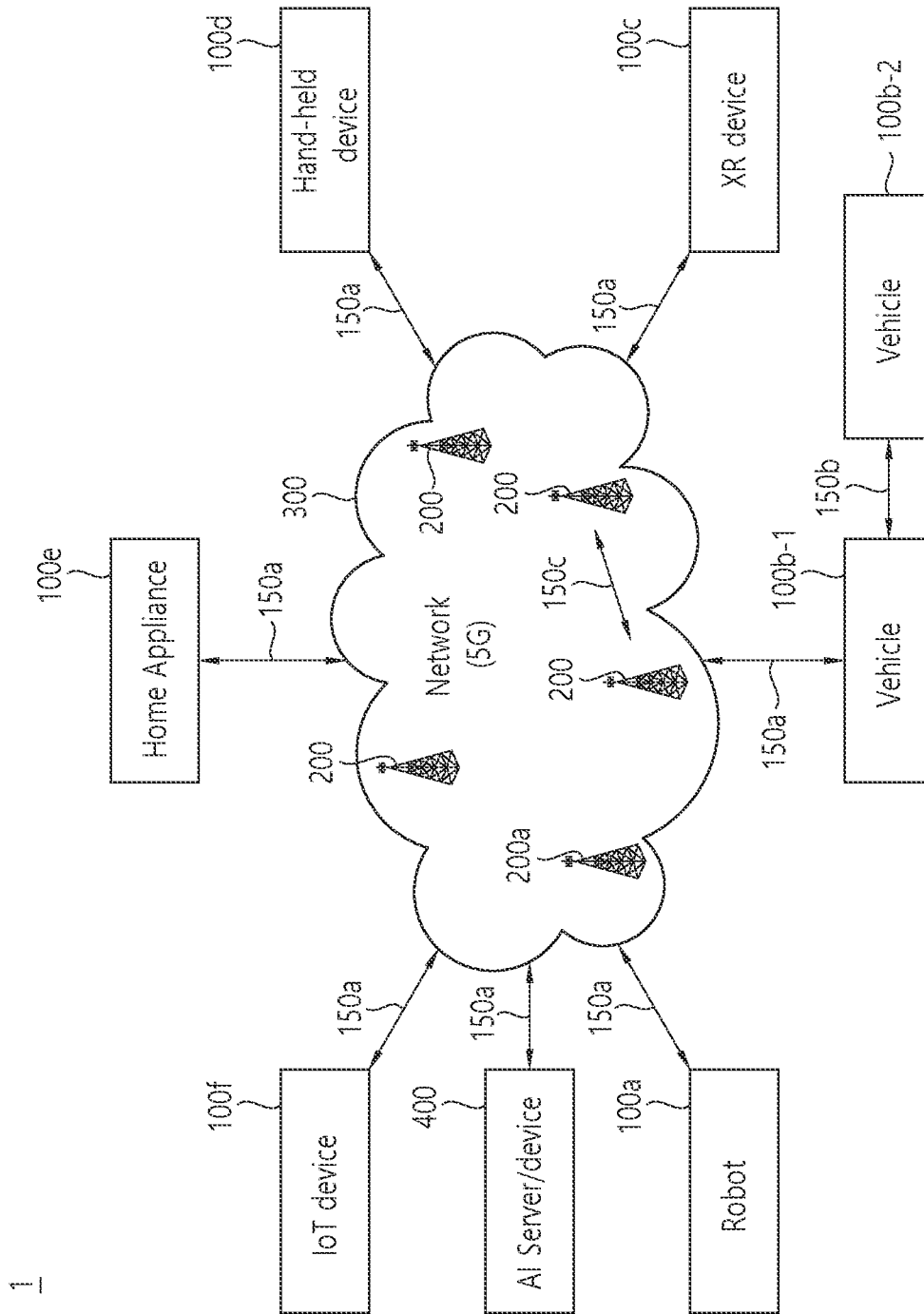
FIG. 1 shows an example of a communication system to which implementations of the present disclosure is applied.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/ demodulation, and resource mapping/de-mapping), and resource allocating processes, for transmitting/receiving radio signals, may be performed based on the various proposals of the present disclosure.

Figure 2:
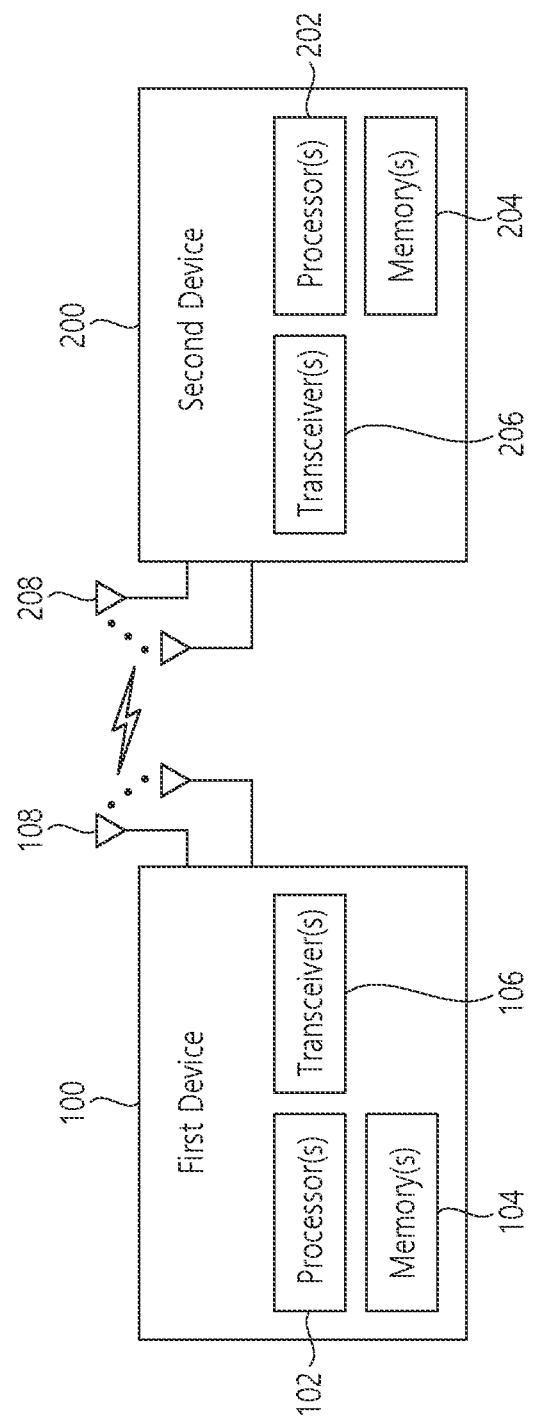
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. Descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
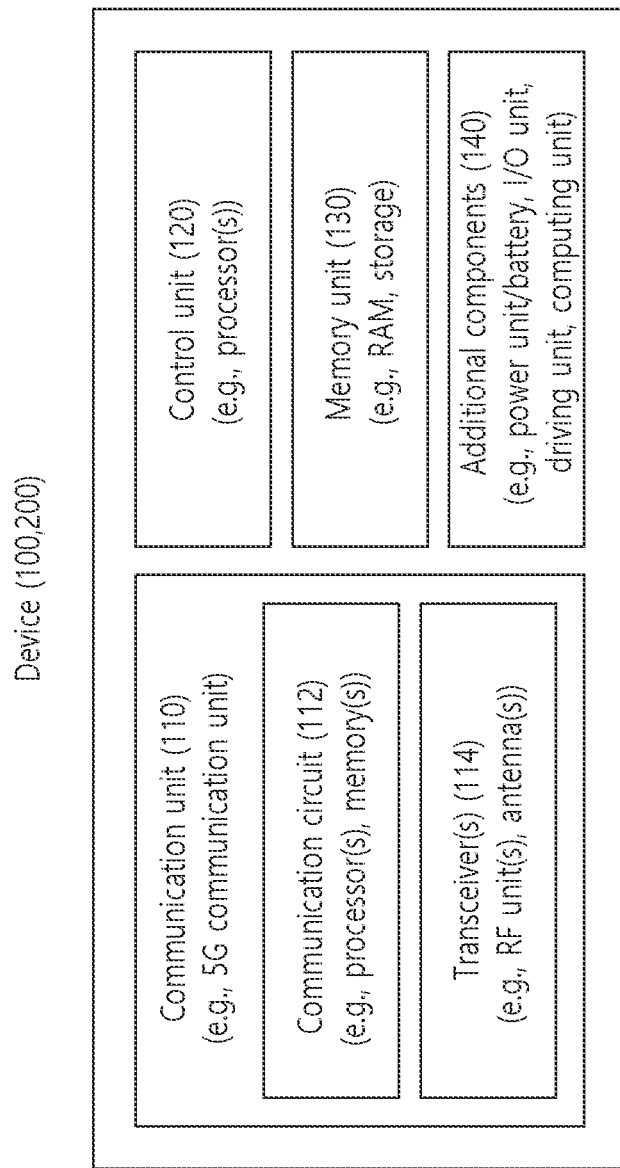
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
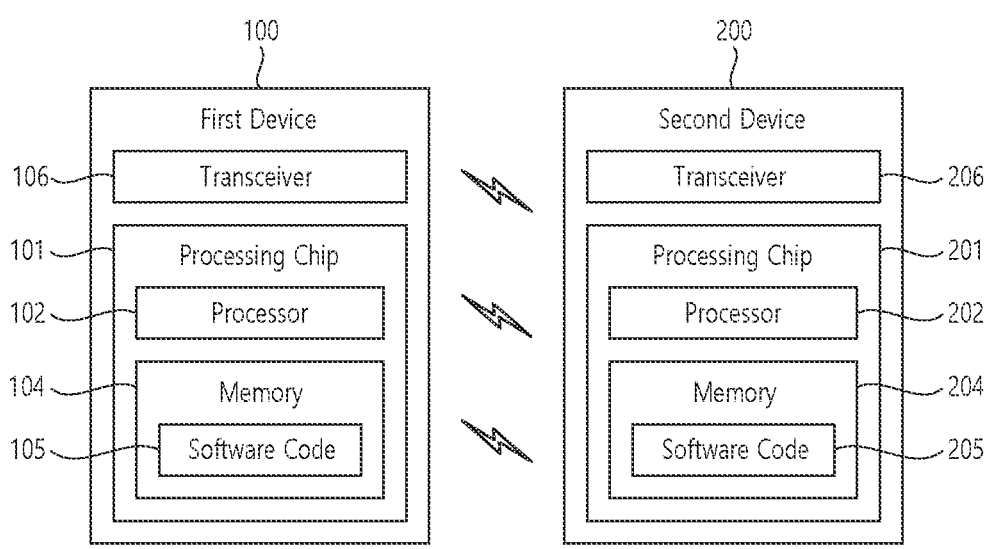
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
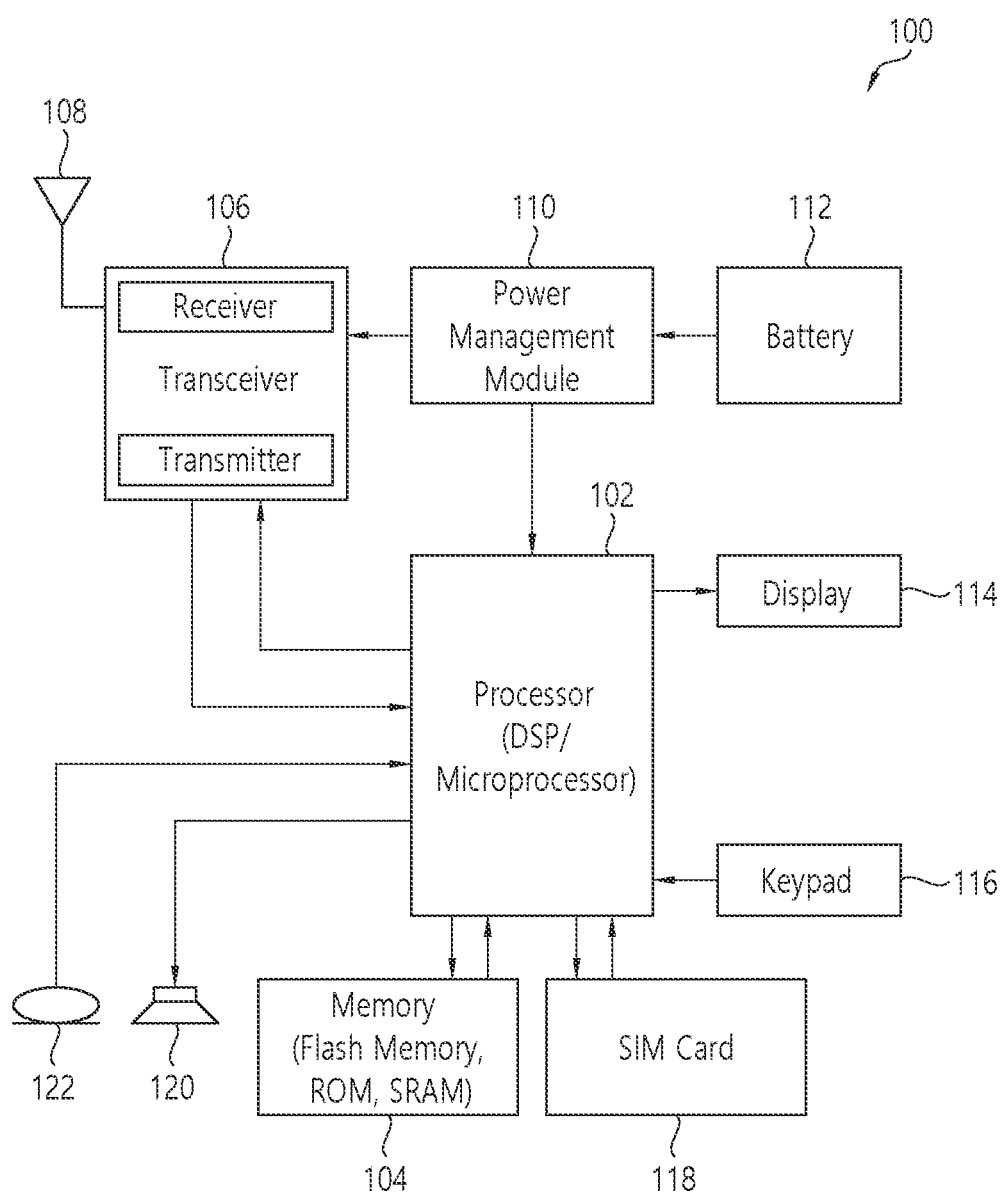
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIOI™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
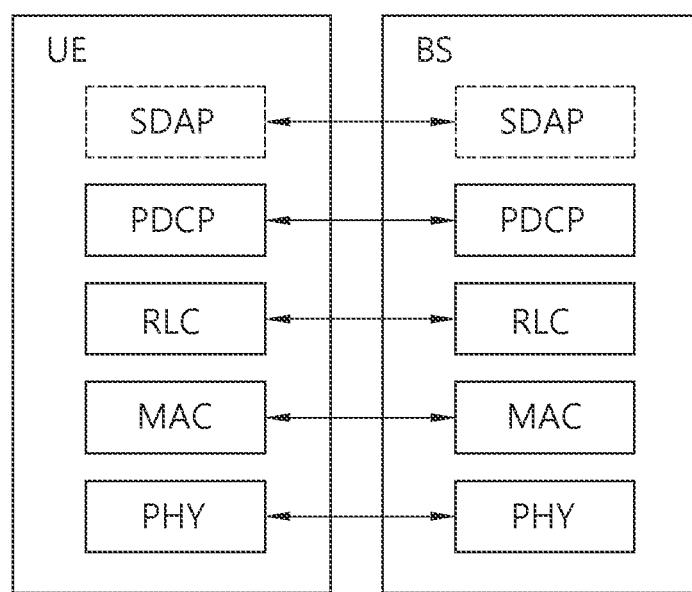
FIGS. 6 and 7 show an example of protocol stacks in a 3GPP based wireless communication system to which implementations of the present disclosure is applied.
Figure 7:
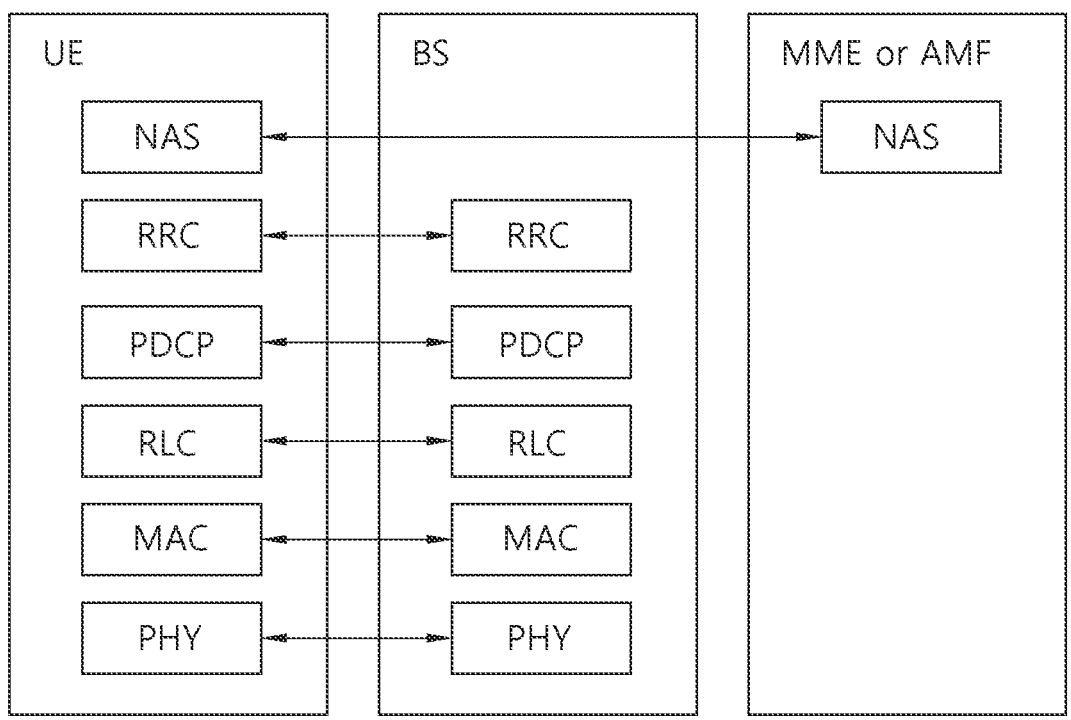

FIGS. 6 and 7 show an example of protocol stacks in a 3GPP based wireless communication system to which implementations of the present disclosure is applied. In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
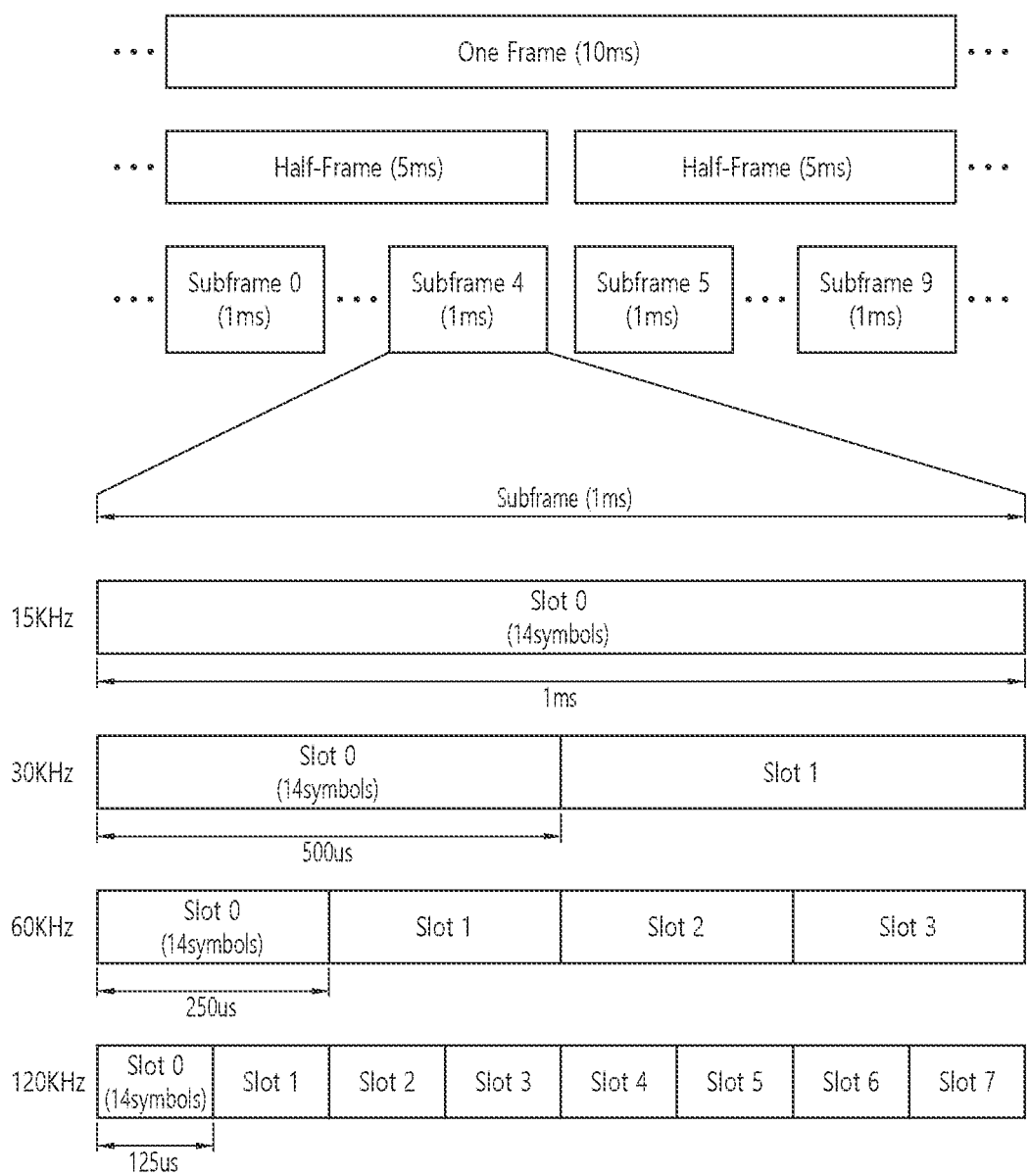
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
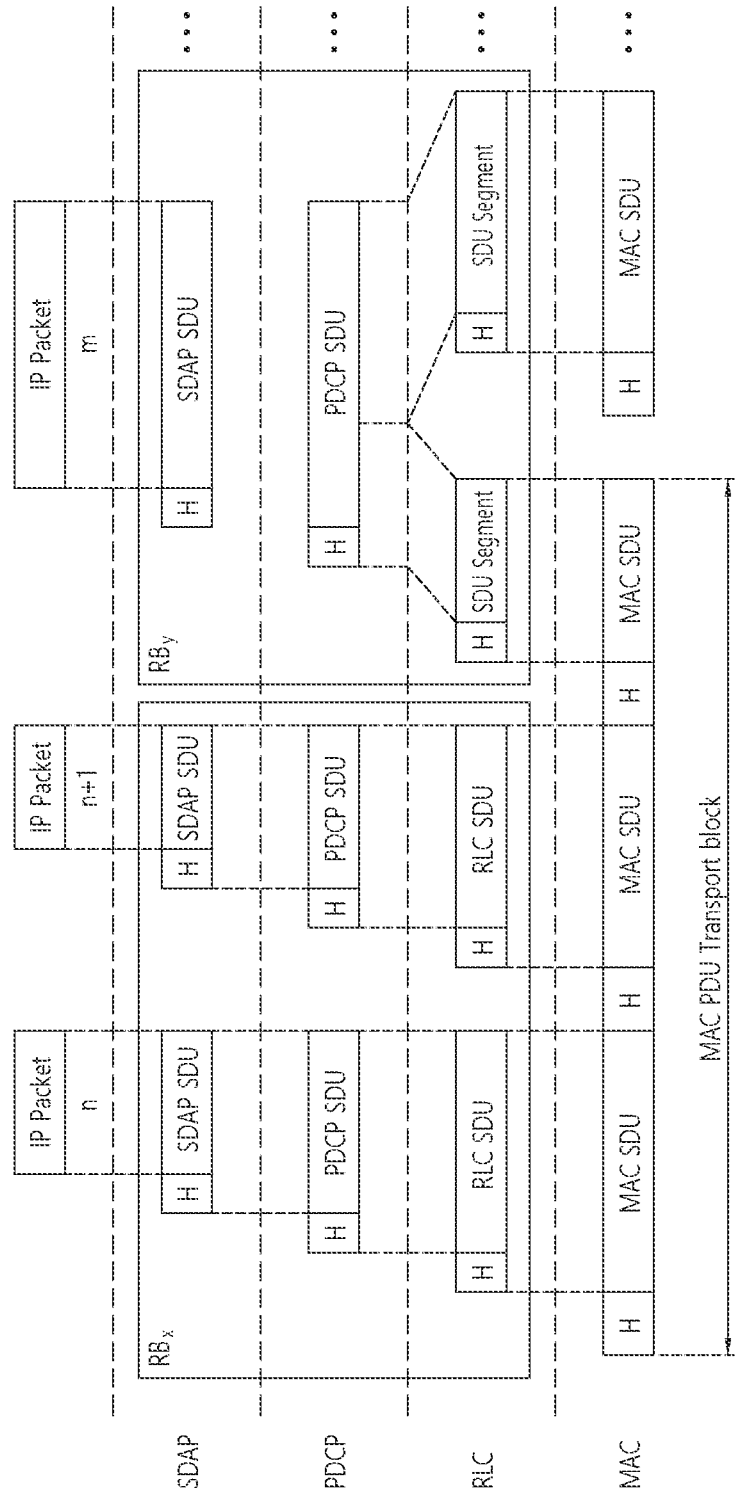
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Vehicle-to-everything (V2X) communication in 5G NR is described. Sections 5.2 and 5.6 of 3GPP TS 23.287 V1.1.0 can be referred.

For V2X communication, two types of PC5 reference points exist: the LTE based PC5 reference point, and the NR based PC5 reference point. A UE may use either type of PC5 or both for V2X communication depending on the services the UE supports. The V2X communication over PC5 reference point supports roaming and inter-public land mobile network (PLMN) operations. V2X communication over PC5 reference point is supported when UE is "served by NR or E-UTRA" or when the UE is "not served by NR or E-UTRA".

A UE is authorized to transmit and receive V2X messages when it has valid authorization and configuration.

The V2X communication over PC5 reference point has the following characteristics:

V2X communication over LTE based PC5 reference point is connectionless, i.e., broadcast mode at access stratum (AS) layer, and there is no signaling over PC5 for connection establishment.

V2X communication over NR based PC5 reference point supports broadcast mode, groupcast mode, and unicast mode at AS layer. The UE will indicate the mode of communication for a V2X message to the AS layer. Signaling over control plane over PC5 reference point for unicast mode communication management is supported.

V2X services communication support between UEs over PC5 user plane.

V2X messages are exchanged between UEs over PC5 user plane. Both internet protocol (IP) based and non-IP based V2X messages are supported over PC5 reference point. For IP based V2X messages, only IP version 6 (IPv6) is used. IP version 4 (IPv4) is not supported.

The identifiers used in the V2X communication over PC5 reference point are described below in detail. UE decides on the type of PC5 reference point and Tx Profile to use for the transmission of a particular packet based on the configuration.

If the UE has an ongoing emergency session via industrial scientific and medical (IMS), the ongoing emergency session via IMS shall be prioritized over V2X communication over PC5 reference point.

Broadcast mode of communication is supported over both LTE based PC5 reference point and NR based PC5 reference point. Therefore, when broadcast mode is selected for transmission over PC5 reference point, PC5 RAT selection needs to be performed based on configuration.

For LTE based PC5 reference point, broadcast mode is the only supported communication mode.

For NR based PC5 reference point, the broadcast mode also supports enhanced QoS handling.

Groupcast mode of communication is only supported over NR based PC5 reference point.

Unicast mode of communication is only supported over NR based PC5 reference point. The following principles apply when the V2X communication is carried over PC5 unicast link:

- A PC5 unicast link between two UEs allows V2X communication between one or more pairs of peer V2X services in these UEs. All V2X services in the UE using the same PC5 unicast link use the same Application Layer ID. An Application Layer ID may change in time due to privacy. This does not cause a re-establishment of a PC5 unicast link.
- One PC5 unicast link supports one or more V2X services (e.g., provider service identifiers (PSIDs) or intelligent transport systems application identifiers (ITS-AIDs)) if these V2X services are at least associated with the pair of peer Application Layer IDs for this PC5 unicast link. For example, UE A and UE B have two PC5 unicast links, one between peer Application Layer ID 1/UE A and Application Layer ID 2/UE B and one between peer Application Layer ID 3/UE A and Application Layer ID 4/UE B. A source UE is not required to know whether different target Application Layer IDs over different PC5 unicast links belong to the same target UE.
- A PC5 unicast link supports V2X communication using a single network layer protocol e.g., IP or non-IP.
- A PC5 unicast link supports per-flow QoS model.

When the Application Layer in the UE initiates data transfer for a V2X service which requires unicast mode of communication over PC5 reference point:

- the UE shall reuse an existing PC5 unicast link if the pair of peer Application Layer IDs and the network layer protocol of this PC5 unicast link are identical to those required by the Application Layer in the UE for this V2X service, and modify the existing PC5 unicast link to add this V2X service; otherwise
- the UE shall trigger the establishment of a new PC5 unicast link.

After successful PC5 unicast link establishment, UE A and UE B use the same pair of Layer-2 IDs for subsequent PC5-S signaling message exchange and V2X service data transmission. The V2X layer of the transmitting UE indicates to the AS layer whether a transmission is for a PC5-S signaling message (i.e., direct communication request/accept, link identifier update request/response, disconnect request/response, link modification request/accept) or V2X service data.

For every PC5 unicast link, a UE self-assigns a distinct PC5 link identifier that uniquely identifies the PC5 unicast link in the UE for the lifetime of the PC5 unicast link. Each PC5 unicast link is associated with a unicast link profile which includes:

- service type(s) (e.g., PSID or ITS-AID), Application Layer ID and Layer-2 ID of UE A; and
- Application Layer ID and Layer-2 ID of UE B; and
- network layer protocol used on the PC5 unicast link; and
- for each V2X service, a set of PC5 QoS flow identifier(s) (PFI(s)). Each PFI is associated with QoS parameters (i.e., PC5 5QI (PQI) and optionally range).

For privacy reason, the Application Layer IDs and Layer-2 IDs may change during the lifetime of the PC5 unicast link and, if so, shall be updated in the unicast link profile accordingly. The UE uses PC5 link identifier to indicate the PC5 unicast link to V2X Application Layer, therefore V2X Application Layer identifies the corresponding PC5 unicast link even if there are more than one unicast link associated with one service type (e.g., the UE establishes multiple unicast links with multiple UEs for a same service type).

The unicast link profile shall be updated accordingly after a Layer-2 link modification for an established PC5 unicast link.

Identifiers for V2X communication is described.

Each UE has one or more Layer-2 IDs for V2X communication over PC5 reference point, consisting of:

Source Layer-2 ID(s); and
Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described below in detail. The source Layer-2 IDs may differ between different communication modes.

When IP-based V2X communication is supported, the UE configures a link local IPv6 address to be used as the source IP address. The UE may use this IP address for V2X communication over PC5 reference point without sending neighbor solicitation and neighbor advertisement message for duplicate address detection.

If the UE has an active V2X application that requires privacy support in the current geographical area, as identified by configuration, in order to ensure that a source UE (e.g., vehicle) cannot be tracked or identified by any other UEs (e.g., vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g., when the application layer ID changes, the source Layer-2 ID and the source IP address need to be changed.

For broadcast mode of V2X communication over PC5 reference point, the UE is configured with the destination Layer-2 ID(s) to be used for V2X services. The destination Layer-2 ID for a V2X communication is selected based on the configuration.

The UE self-selects a source Layer-2 ID. The UE may use different source Layer-2 IDs for different types of PC5 reference points, i.e., LTE based PC5 and NR based PC5.

For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g., PSID/ITS-AID) and Layer-2 ID.

The UE self-selects a source Layer-2 ID.

For unicast mode of V2X communication over PC5 reference point, the destination Layer-2 ID used depends on the communication peer, which is discovered during the establishment of the PC5 unicast link. The initial signaling for the establishment of the PC5 unicast link may use a default destination Layer-2 ID associated with the service type (e.g., PSID/ITS-AID) configured for PC5 unicast link establishment. During the PC5 unicast link establishment procedure, Layer-2 IDs are exchanged, and should be used for future communication between the two UEs.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

A UE may establish multiple PC5 unicast links with a peer UE and use the same or different source Layer-2 IDs for these PC5 unicast links.

Sidelink resource allocation is described in detail. If the TX UE is in RRC_CONNECTED and configured for gNB scheduled sidelink resource allocation (e.g., Mode 1), the TX UE may transmit sidelink UE Information including traffic pattern of Service, TX carriers and/or RX carriers mapped to service, QoS information related to Service (e.g. 5QI, ProSe-per-packet priority (PPPP), ProSe-per-packet reliability (PPPR), QoS class identifier (QCI) value), and destination related to Service.

After receiving the sidelink UE Information, gNB constructs sidelink configuration at least including one or more resource pools for service and sidelink buffer status reporting (BSR) configuration. gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to gNB. The sidelink BSR indicates at least a destination index, a logical channel group (LCG), and a buffer size corresponding to the destination.

After receiving the sidelink BSR, gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., Mode 2) regardless of RRC state, the TX UE autonomously select or reselect sidelink resources to create a sidelink grant used for transmission to the RX UE.

For NR sidelink transmission, a transmitting UE (TX UE) transmits sidelink control information (SCI) to a receiving UE (RX UE) to indicate sidelink shared channel (SL-SCH) transmission. When HARQ operation is used for SL-SCH transmissions, the SCI may indicate to the RX UE which SL-SCH transmissions should be received and combined for the same HARQ process. Thus, the RX UE will combine differently received SL-SCH transmissions into the same HARQ buffer of the HARQ process.

Meanwhile, as mentioned above, source Layer-2 ID and destination Layer-2 ID are used to uniquely identify different SL-SCH transmissions. Since UE should identify combinable SL-SCH transmissions based on SCI before decoding a MAC PDU on SL-SCH, UE only should rely on the SCI to identify combinable SL-SCH transmissions. Thus, SCI may need to indicate both source Layer-2 ID and destination Layer-2 ID. However, if each ID is 24 bits long as in LTE V2X, NR SCI transmission should support more than 48 bits which will be too heavy to be carried in a SCI transmission.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
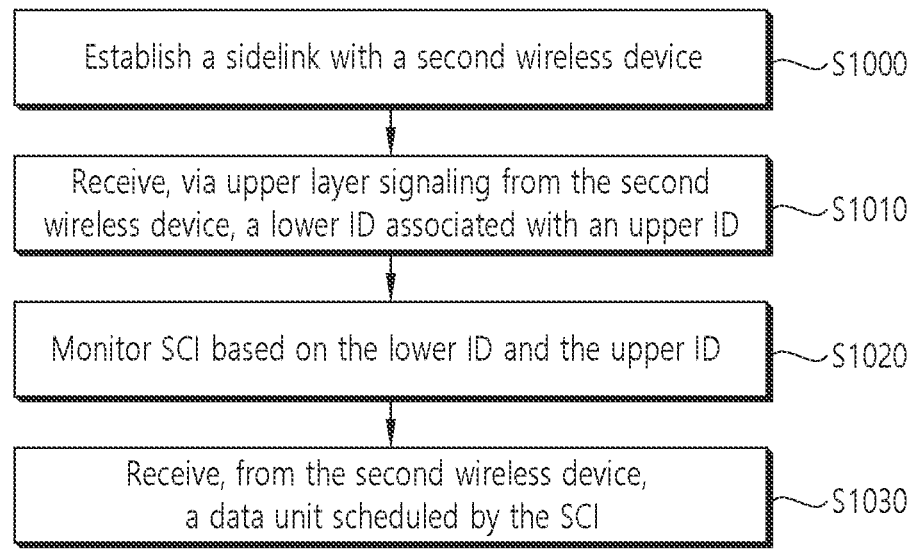
FIG. 10 shows an example of a method performed by a first wireless device (e.g., receiving (RX) wireless device)

FIG. 10 shows an example of a method performed by a first wireless device (e.g., receiving (RX) wireless device) configured to operate in a wireless communication system to which implementations of the present disclosure is applied.

In step S1000, the first wireless device establishes a sidelink with a second wireless device. That is, the first wireless device establishes a direct link with the second wireless device for a service.

In some implementations, the direct link may be a unicast link. That is, the service may be a unicast service. In this case, the first wireless device may be a receiving wireless device of the unicast service, and the second wireless device may be a transmitting wireless device of the unicast service.

In some implementations, the direct link may be a groupcast link. That is, the service may be a groupcast service. In this case, the first wireless device may be one of a receiving wireless devices of the groupcast service to be provided to a group including the first wireless device, and the second wireless device may be a wireless device of the groupcast service.

In some implementations, the first wireless device may determine at least one upper identifier (e.g., Layer-2 ID) for the direct link.

For example, the upper ID may be either a source Layer-2 ID or a destination Layer-2 IDs for the direct link.

For example, the upper ID may be ID of the first wireless device or ID of the second wireless device.

In step S1010, the first wireless device monitors a control channel, transmitted by the second wireless device, addressed to at least the upper ID, and receives, from the second wires device, a lower ID associated with the upper ID via a data channel scheduled by the control channel. The lower ID is received via upper layer signaling, e.g., PC5-RRC message.

In some implementations, the control channel may carry the SCI, and the data channel may be SL-SCH.

In step S1020, after receiving the lower ID from the second wireless device, the first wireless device monitors SCI based on the lower ID and the upper ID. That is, the first wireless device may monitor the control channel indicating both the lower ID and the upper ID.

In some implementations, for sidelink transmission of the unicast service, the SCI on the control channel may include the lower ID (e.g., destination Layer-1 ID) allocated to the first wireless device and the upper ID (e.g., source Layer-2 ID) of the second wireless device and.

In some implementations, for sidelink transmission of the groupcast service, the SCI on the control channel may include the upper ID (e.g., destination Layer-2 ID) of a group including the first wireless device and the lower ID (e.g., source Layer-1 ID) allocated to the second wireless device. The upper ID of the group may correspond to the groupcast service.

In step S1030, the first wireless device receives, from the second wireless device, a data unit scheduled by the SCI.

In some implementations, a header of the data unit may include a source Layer-2 ID and/or a destination Layer-2 ID.

In some implementations, the first wireless device may transmit, to the second wireless device, a feedback for the data unit based on the lower ID.

In some implementations, the first wireless device may be in communication with at least one of a mobile device, a network, and/or autonomous vehicles other than the first wireless device.

Furthermore, the method in perspective of the first wireless device described above in FIG. 10 may be performed by first wireless device 100 shown in FIG. 2, the wireless device 100 shown in FIG. 3, the first wireless device 100 shown in FIG. 4 and/or the UE 100 shown in FIG. 5.

More specifically, the first wireless device comprises at least one transceiver, at least processor, and at least one computer memory operably connectable to the at least one processor and storing instructions that, based on being executed by the at least one processor, perform operations.

The operations comprise establishing a sidelink with a second wireless device, receiving, via upper layer signaling from the second wireless device, a lower ID associated with an upper ID, monitoring SCI based on the lower ID and the upper ID, and receiving, from the second wireless device, a data unit scheduled by the SCI.

In some implementations, the direct link may be a unicast link. That is, the service may be a unicast service. In this case, the first wireless device may be a receiving wireless device of the unicast service, and the second wireless device may be a transmitting wireless device of the unicast service.

In some implementations, the direct link may be a groupcast link. That is, the service may be a groupcast service. In this case, the first wireless device may be one of a receiving wireless devices of the groupcast service to be provided to a group including the first wireless device, and the second wireless device may be a wireless device of the groupcast service.

In some implementations, the first wireless device may determine at least one upper identifier (e.g., Layer-2 ID) for the direct link.

For example, the upper ID may be either a source Layer-2 ID or a destination Layer-2 IDs for the direct link.

For example, the upper ID may be ID of the first wireless device or ID of the second wireless device.

In some implementations, the control channel may carry the SCI, and the data channel may be SL-SCH.

In some implementations, for sidelink transmission of the unicast service, the SCI on the control channel may include the lower ID (e.g., destination Layer-1 ID) allocate to the first wireless device and the upper ID (e.g., source Layer-2 ID) of the second wireless device and.

In some implementations, for sidelink transmission of the groupcast service, the SCI on the control channel may include the upper ID (e.g., destination Layer-2 ID) of a group including the first wireless device and the lower ID (e.g., source Layer-1 ID) allocated to the second wireless device. The upper ID of the group may correspond to the groupcast service.

In some implementations, a header of the data unit may include a source Layer-2 ID and/or a destination Layer-2 ID.

In some implementations, the first wireless device may transmit, to the second wireless device, a feedback for the data unit based on the lower ID.

Furthermore, the method in perspective of the first wireless device described above in FIG. 10 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, the first wireless device configured to operate in a wireless communication system (e.g., wireless device) comprises at least processor, and at least one computer memory operably connectable to the at least one processor. The at least one processor is configured to perform operations comprising establishing a sidelink with a second wireless device, receiving, via upper layer signaling from the second wireless device, a lower ID associated with an upper ID, monitoring SCI based on the lower ID and the upper ID, and receiving, from the second wireless device, a data unit scheduled by the SCI.

In some implementations, the direct link may be a unicast link. That is, the service may be a unicast service. In this case, the first wireless device may be a receiving wireless device of the unicast service, and the second wireless device may be a transmitting wireless device of the unicast service.

In some implementations, the direct link may be a groupcast link. That is, the service may be a groupcast service. In this case, the first wireless device may be one of a receiving wireless devices of the groupcast service to be provided to a group including the first wireless device, and the second wireless device may be a wireless device of the groupcast service.

In some implementations, the first wireless device may determine at least one upper identifier (e.g., Layer-2 ID) for the direct link.

For example, the upper ID may be either a source Layer-2 ID or a destination Layer-2 IDs for the direct link.

For example, the upper ID may be ID of the first wireless device or ID of the second wireless device.

In some implementations, the control channel may carry the SCI, and the data channel may be SL-SCH.

In some implementations, for sidelink transmission of the unicast service, the SCI on the control channel may include the lower ID (e.g., destination Layer-1 ID) allocate to the first wireless device and the upper ID (e.g., source Layer-2 ID) of the second wireless device and.

In some implementations, for sidelink transmission of the groupcast service, the SCI on the control channel may include the upper ID (e.g., destination Layer-2 ID) of a group including the first wireless device and the lower ID (e.g., source Layer-1 ID) allocated to the second wireless device. The upper ID of the group may correspond to the groupcast service.

In some implementations, a header of the data unit may include a source Layer-2 ID and/or a destination Layer-2 ID.

In some implementations, the first wireless device may transmit, to the second wireless device, a feedback for the data unit based on the lower ID.

Furthermore, the method in perspective of the first wireless device described above in FIG. 10 may be performed by a software code 105 stored in the memory 104 included in the first wireless device 100 shown in FIG. 4.

More specifically, at least one computer readable medium (CRM) stores instructions that, based on being executed by at least one processor, perform operations comprising establishing a sidelink with a second wireless device, receiving, via upper layer signaling from the second wireless device, a lower ID associated with an upper ID, monitoring SCI based on the lower ID and the upper ID, and receiving, from the second wireless device, a data unit scheduled by the SCI.

FIG. 11 shows an example of a method performed by a second wireless device (e.g., transmitting (TX) wireless device) configured to operate in a wireless communication system to which implementations of the present disclosure is applied.

In some implementations, the second wireless device may receive allocated sidelink resources (e.g., sidelink grant) from a network. Additionally and/or alternatively, the second wireless device may autonomously select sidelink resources from a pool of sidelink resources.

In step S1100, the second wireless device establishes a sidelink with a first wireless device. That is, the second wireless device establishes a direct link with the first wireless device for a service.

In some implementations, the direct link may be a unicast link. That is, the service may be a unicast service. In this case, the second wireless device may be a transmitting wireless device of the unicast service and the first wireless device may be a receiving wireless device of the unicast service.

In some implementations, the direct link may be a groupcast link. That is, the service may be a groupcast service. In this case, the second wireless device may be a wireless device of the groupcast service and the first wireless device may be one of a receiving wireless devices of the groupcast service to be provided to a group including the first wireless device.

In some implementations, the first wireless device may determine at least one upper identifier (e.g., Layer-2 ID) for the direct link.

For example, the upper ID may be either a source Layer-2 ID or a destination Layer-2 IDs for the direct link.

For example, the upper ID may be ID of the first wireless device or ID of the second wireless device.

In step S1110, the second wireless device creates at least one lower ID associated with the upper ID.

In step S1120, the second wireless device transmits, to the first wireless device, the lower ID via a data channel, e.g., SL-SCH, scheduled by a control channel, e.g., SCI. The lower ID is transmitted via upper layer signaling, e.g., PC5-RRC message.

In some implementations, the second wireless device may also transmit, to the first wireless device, the upper ID together with the lower ID. The lower ID may be carried in a MAC PDU on SL-SCH transmission, and the upper ID may be carried in SCI associated with the SL-SCH transmission.

In step S1130, the second wireless device transmits, to the first wireless device, a data unit scheduled by SCI indicating both the upper ID and the lower ID. That is, the second wireless device performs data transmission of the service scheduled by the control channel indicating both the upper ID and the lower ID to the first wireless device.

In some implementations, for sidelink transmission of the unicast service, the SCI on the control channel may include the lower ID (e.g., destination Layer-1 ID) allocated to the first wireless device and the upper ID (e.g., source Layer-2 ID) of the second wireless device and. T In some implementations, for sidelink transmission of the groupcast service, the SCI on the control channel may include the upper ID (e.g., destination Layer-2 ID) of a group including the first wireless device and the lower ID (e.g., source Layer-1 ID) allocated to the second wireless device. The upper ID of the group may correspond to the groupcast service.

In some implementations, the data unit may be transmitted on a data channel, e.g., SL-SCH.

In some implementations, a header of the data unit may include a source Layer-2 ID and/or a destination Layer-2 ID.

In some implementations, the upper ID and the lower ID may be associated with different wireless devices.

In some implementations, the second wireless device may receive, from the first wireless device, a feedback for the data unit based on the lower ID.

In some implementations, the second wireless device may be in communication with at least one of a mobile device, a network, and/or autonomous vehicles other than the second wireless device.

Furthermore, the method in perspective of the second wireless device described above in FIG. 11 may be performed by second wireless device 200 shown in FIG. 2, the wireless device 100 shown in FIG. 3, the second wireless device 200 shown in FIG. 4 and/or the UE 100 shown in FIG. 5.

More specifically, the second wireless device comprises at least one transceiver, at least processor, and at least one computer memory operably connectable to the at least one processor and storing instructions that, based on being executed by the at least one processor, perform operations.

The operations comprise establishing a sidelink with a first wireless device, creating a lower ID associated with an upper ID, transmitting, to the first wireless device, the lower ID, and transmitting, to the first wireless device, a data unit scheduled by SCI indicating both the upper ID and the lower ID.

Furthermore, the method in perspective of the second wireless device described above in FIG. 11 may be performed by control of the processor 202 included in the second wireless device 200 shown in FIG. 2, by control of the communication unit 110 and/or the control unit 120 included in the wireless device 100 shown in FIG. 3, by control of the processor 202 included in the second wireless device 100 shown in FIG. 4 and/or by control of the processor 102 included in the UE 100 shown in FIG. 5.

More specifically, the second wireless device configured to operate in a wireless communication system (e.g., wireless device) comprises at least processor, and at least one computer memory operably connectable to the at least one processor. The at least one processor is configured to perform operations comprising establishing a sidelink with a first wireless device, creating a lower ID associated with an upper ID, transmitting, to the first wireless device, the lower ID, and transmitting, to the first wireless device, a data unit scheduled by SCI indicating both the upper ID and the lower ID.

Furthermore, the method in perspective of the second wireless device described above in FIG. 11 may be performed by a software code 205 stored in the memory 204 included in the second wireless device 100 shown in FIG. 4.

More specifically, at least one CRM stores instructions that, based on being executed by at least one processor, perform operations comprising establishing a sidelink with a first wireless device, creating a lower ID associated with an upper ID, transmitting, to the first wireless device, the lower ID, and transmitting, to the first wireless device, a data unit scheduled by SCI indicating both the upper ID and the lower ID.

FIG. 12 shows an example of PC5 procedures for a UE performing sidelink communication to which implementations of the present disclosure is applied.

In some implementations, RX UE1 and/or RX UE2 in FIG. 12 may correspond to a first wireless device described above in FIG. 10 and/or FIG. 11. In some implementations, TX UE in FIG. 12 may correspond to a second wireless device described above in FIG. 10 and/or FIG. 11.

In some implementations, if the TX UE is in RRC_CONNECTED and configured for gNB scheduled sidelink resource allocation, the TX UE receives a sidelink grant from a network, e.g., by DCI in PDCCH. The DCI may include an allocated sidelink resource. The TX UE may use the sidelink grant for transmission to the RX UE.

In some implementations, if the TX UE is configured for UE autonomous scheduling of sidelink resource allocation regardless of RRC state, the TX UE autonomously select and/or reselect sidelink resources to create a sidelink grant used for transmission to the RX UE.

In step S1200, the TX UE establishes a direct link with the RX UE1 for a unicast service. The TX UE determines at least one Layer-2 ID (e.g., upper layer ID) for the direct link. The TX UE and the RX UE1 performs PC5-S direct link setup procedure for unicast service. The TX UE and the RX UE1 may exchange the determined at least one Layer-2 ID.

In some implementations, the Layer-2 ID may include at least one of a source Layer-2 ID and/or a destination Layer-2 ID for the direct link. The TX UE and the RX UE may determine both source Layer-2 ID and destination Layer-2 ID for the direct link.

In some implementations, the Layer-2 ID may include ID of the TX UE or ID of the RX UE1.

In step S1202, the TX UE establishes a direct link with the RX UE1 and the RX UE2 for a groupcast service (or a broadcast service). The TX UE determines at least one Layer-2 ID for the direct link. The TX UE and the RX UE1/UE2 performs PC5-S direct link setup procedure for groupcast service. The TX UE and the RX UE1/UE2 may exchange the determined at least one Layer-2 ID.

In some implementations, the Layer-2 ID may include at least one of a source Layer-2 ID and/or a destination Layer-2 ID for the groupcast service. The TX UE may determine both source Layer-2 ID and destination Layer-2 ID for the groupcast service. The source Layer-2 ID may correspond to the TX UE while the destination Layer-2 ID may correspond to a group including the RX UE1 and RX UE2, or the groupcast service.

In step S1210, the TX UE creates at least one Layer-1 ID (e.g., Layer-1 ID #1) associated with the Layer-2 ID for the unicast service. In step S1212, the TX UE allocates the Layer-1 ID #1 to the RX UE1 and transmits the Layer-1 ID #1 to the RX UE1 via a PC5-RRC message transmitted on SL-SCH scheduled by SCI.

In some implementations, the TX UE may also transmit the Layer-2 ID associated with the Layer-1 ID #1 to the RX UE1 together with the Layer-1 ID #1. In this case, the Layer-1 ID #1 may be carried in a MAC PDU on SL-SCH transmission while the Layer-2 ID may be carried in the SCI which schedules the SL-SCH transmission carrying the Layer-1 ID #1.

In some implementations, for unicast service, the Layer-1 ID #1 may be a destination Layer-1 ID allocated to the RX UE1.

In step S1220, the TX UE creates at least one Layer-1 ID (e.g., Layer-1 ID #2) associated with the Layer-2 ID for the groupcast service. In step S1222, the TX UE allocates the Layer-1 ID #2 to the RX UE1 and RX UE2 and transmits the Layer-1 ID #2 to the RX UE1 and RX UE2 via a PC5-RRC message transmitted on SL-SCH scheduled by SCI.

In some implementations, the TX UE may also transmit the Layer-2 ID associated with the Layer-1 ID #2 to the RX UE1 and RX UE2 together with the Layer-1 ID #2. In this case, the Layer-1 ID #2 may be carried in a MAC PDU on SL-SCH transmission while the Layer-2 ID may be carried in the SCI which schedules the SL-SCH transmission carrying the Layer-1 ID #2.

In some implementations, for groupcast service, the Layer-1 ID #2 may be a source Layer-1 ID allocated to the TX UE. Alternatively, the Layer-1 ID #2 may be a destination Layer-1 ID allocated to a group including the RX UE1 and RX UE2 or the groupcast service.

In step S1230, the TX UE transmits SCI indicating both the Layer-1 ID #1 and the Layer-2 ID. In step S1232, the TX UE transmits a MAC PDU of the unicast service on SL-SCH scheduled by the SCI.

In some implementations, for unicast service, the Layer-1 ID #1 may be the destination Layer-1 ID allocated to RX UE1. The Layer-2 ID may be the source Layer-2 ID allocated to the TX UE.

In some implementations, the header of the MAC PDU may or may not include at least of the source Layer-2 ID and/or destination Layer-2 ID.

In some implementations, after receiving the Layer-1 ID #1 in step S1212, the RX UE1 monitors SCI transmission indicating both the Layer-1 ID #1 and the Layer-2 ID. If the received SCI indicates both the Layer-1 ID #1 and the Layer-2 ID, the RX UE1 receives the SL-SCH transmission of the unicast service scheduled by the SCI in step S1232.

In step S1234, if HARQ feedback for SL-SCH transmission is indicated in the SCI or has been configured by the PC5-RRC message, the RX UE1 may transmit HARQ feedback such as HARQ ACK or NACK to the TX UE. The HARQ feedback may indicate the Layer-1 ID #1 and/or the Layer-2 ID.

In some implementations, when HARQ feedback is indicated and/or configured, and if transmission of the MAC PDU is not positively acknowledged (e.g., HARQ NACK), the TX UE may perform HARQ retransmission of the MAC PDU for which SCI transmission indicates both the same Layer-1 ID #1 and the same Layer-2 ID for retransmission.

In step S1240, the TX UE transmits SCI indicating both the Layer-1 ID #2 and the Layer-2 ID. In step S1232, the TX UE transmits a MAC PDU of the groupcast service on SL-SCH scheduled by the SCI.

In some implementations, for groupcast service, the Layer-1 ID #2 may be the source Layer-1 ID allocated to RX UE1. The Layer-2 ID may be a destination Layer-2 ID of the groupcast service used for both the RX UE1 and RX UE2.

In some implementations, the header of the MAC PDU may or may not include at least of the source Layer-2 ID and/or destination Layer-2 ID.

In some implementations, after receiving the Layer-1 ID #2 in step S1222, the RX UEs (i.e., RX UE1/RX UE2) monitor SCI transmission indicating both the Layer-1 ID #2 and the Layer-2 ID. If the received SCI indicates both the Layer-1 ID #2 and the Layer-2 ID, the RX UEs receive the SL-SCH transmission of the groupcast service scheduled by the SCI in step S1242.

In step S1244, if HARQ feedback for SL-SCH transmission is indicated in the SCI or has been configured by the PC5-RRC message, each RX UE may transmit HARQ feedback such as HARQ ACK or NACK to the TX UE. The HARQ feedback may indicate the Layer-1 ID #2 and/or the Layer-2 ID. Different RX UEs may use the same sidelink resource and/or different sidelink resources for transmission of the HARQ feedback.

In some implementations, when HARQ feedback is indicated and/or configured, and if transmission of the MAC PDU is not positively acknowledged (e.g., HARQ NACK) at least by one RX UE, the TX UE may perform HARQ retransmission of the MAC PDU for which SCI transmission indicates both the same Layer-1 ID #2 and the same Layer-2 ID for retransmission.

In some implementations, each RX UE may perform measurements on transmissions from the TX UE. When the RX UE transmits measured results such as channel quality indicator (CQI) report, channel state information (CSI) report, reference signal received power (RSRP), reference signal received quality (RSRQ), etc., in a message, the RX UE may indicate at least one of the Layer-1 ID and the Layer-2 ID for transmission of the message.

The present disclosure can have various advantageous effects.

For example, one UE can allocate a lower ID associated with an upper ID to the other UE for a direct link, in particular when the UE performs sidelink transmissions with one or several UEs.

For example, the system can avoid collision of IDs with low overhead in sidelink control information transmissions for the direct link between UEs performing sidelink communication.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device configured to operate in a wireless communication system, the method comprising:
    establishing a direct link with a second wireless device for a unicast service;
    identifying a source layer-2 identifier (ID) and a destination layer-2 ID;
    receiving, from the second wireless device, a destination layer-1 ID associated with the destination layer-2 ID;
    monitoring sidelink control information (SCI) from the second wireless device after receiving the destination layer-1 ID; and
    based on the SCI including i) a first ID corresponding to the destination layer-1 ID and ii) a second ID corresponding to the source layer-2 ID, receiving, from the second wireless device, data on a data channel scheduled by the SCI.

2. The method of claim 1, further comprising transmitting, to the second wireless device, a feedback for the data based on the destination layer-1 ID.

3. The method of claim 1, wherein a header of the data includes at least one of a source layer-2 ID or a destination layer-2 ID.

4. The method of claim 1, wherein the first wireless device is in communication with at least one of a mobile device, a network, or autonomous vehicles other than the first wireless device.

5. A first wireless device configured to operate in a wireless communication system, the first wireless device comprising:
    at least one transceiver;
    at least one processor; and
    at least one computer memory operably connectable to the at least one processor and storing instructions that, based on being executed by the at least one processor, perform operations comprising:
    establishing a direct link with a second wireless device for a unicast service;
    identifying a source layer-2 identifier (ID) and a destination layer-2 ID;
    receiving, from the second wireless device, a destination layer-1 ID associated with the destination layer-2 ID;
    monitoring sidelink control information (SCI) from the second wireless device after receiving the destination layer-1 ID; and
    based on the SCI including i) a first ID corresponding to the destination layer-1 ID and ii) a second ID corresponding to the source layer-2 ID, receiving, from the second wireless device, data on a data channel scheduled by the SCI.

6. A processing apparatus for a first wireless device configured to operate in a wireless communication system, the processing apparatus comprising:
    at least one processor; and
    at least one computer memory operably connectable to the at least one processor and storing instructions that, based on being executed by the at least one processor, perform operations comprising:
    establishing a direct link with a second wireless device for a unicast service;
    identifying a source layer-2 identifier (ID) and a destination layer-2 ID;
    receiving, from the second wireless device, a destination layer-1 ID associated with the destination layer-2 ID;
    monitoring sidelink control information (SCI) from the second wireless device after receiving the destination layer-1 ID; and
    based on the SCI including i) a first ID corresponding to the destination layer-1 ID and ii) a second ID corresponding to the source layer-2 ID, receiving, from the second wireless device, data on a data channel scheduled by the SCI.

7. The first wireless device of claim 5, wherein the operations further comprise transmitting, to the second wireless device, a feedback for the data based on the destination layer-1 ID.

8. The first wireless device of claim 5, wherein a header of the data includes at least one of a source layer-2 ID or a destination layer-2 ID.

9. The first wireless device of claim 5, wherein the first wireless device is in communication with at least one of a mobile device, a network, or autonomous vehicles other than the first wireless device.

10. The processing apparatus of claim 6, wherein the operations further comprise transmitting, to the second wireless device, a feedback for the data based on the destination layer-1 ID.

11. The processing apparatus of claim 6, wherein a header of the data includes at least one of a source layer-2 ID or a destination layer-2 ID.

12. The processing apparatus of claim 6, wherein the first wireless device is in communication with at least one of a mobile device, a network, or autonomous vehicles other than the first wireless device.

* * * * *